(12) United States Patent
Nylander et al.

(10) Patent No.: US 8,355,725 B2
(45) Date of Patent: Jan. 15, 2013

(54) METHOD AND NODE IN A COMMUNICATIONS NETWORK

(75) Inventors: Tomas Nylander, Varmdo (SE); Kimmo Hiltunen, Esbo (FI); Hakan Olofsson, Stockholm (SE); Jari Vikberg, Jarna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 146 days.

(21) Appl. No.: 12/866,672

(22) PCT Filed: May 20, 2008

(86) PCT No.: PCT/SE2008/050587
§ 371 (c)(1),
(2), (4) Date: Aug. 6, 2010

(87) PCT Pub. No.: WO2009/099363
PCT Pub. Date: Aug. 13, 2009

(65) Prior Publication Data
US 2011/0014920 A1 Jan. 20, 2011

Related U.S. Application Data

(60) Provisional application No. 61/027,092, filed on Feb. 8, 2008.

(51) Int. Cl.
*H04W 36/00* (2009.01)
(52) U.S. Cl. .......................... 455/442; 455/436; 455/438
(58) Field of Classification Search ............... 455/432.3, 455/434, 435.1, 435.2, 436, 437, 438, 442; 370/329, 331
See application file for complete search history.

(56) References Cited

U.S. PATENT DOCUMENTS

| | | | | |
|---|---|---|---|---|
| 5,940,762 | A * | 8/1999 | Lee et al. | 455/442 |
| 5,987,326 | A * | 11/1999 | Tiedemann et al. | 455/442 |
| 6,192,249 | B1 * | 2/2001 | Padovani | 455/453 |
| 6,539,227 | B1 * | 3/2003 | Jetzek et al. | 455/442 |
| 6,611,507 | B1 * | 8/2003 | Hottinen et al. | 370/331 |
| 6,826,161 | B1 * | 11/2004 | Shahidi et al. | 370/331 |
| 6,959,001 | B1 * | 10/2005 | Parks | 370/410 |
| 7,480,272 | B2 * | 1/2009 | Baba et al. | 370/331 |
| 2002/0090944 | A1 * | 7/2002 | Shepherd | 455/435 |
| 2002/0132622 | A1 * | 9/2002 | Bender et al. | 455/442 |
| 2004/0147163 | A1 * | 7/2004 | Chou | 439/502 |
| 2005/0048979 | A1 | 3/2005 | Chun et al. | |
| 2005/0181814 | A1 * | 8/2005 | Okamoto et al. | 455/517 |
| 2006/0046735 | A1 * | 3/2006 | Gross et al. | 455/452.2 |
| 2006/0286983 | A1 * | 12/2006 | Otsuka et al. | 455/444 |
| 2007/0004423 | A1 | 1/2007 | Gerlach et al. | |
| 2007/0280175 | A1 | 12/2007 | Cheng et al. | |
| 2009/0082021 | A1 * | 3/2009 | Matsuzawa et al. | 455/436 |

FOREIGN PATENT DOCUMENTS
WO 2005/125250 A1 12/2005

* cited by examiner

*Primary Examiner* — Jean Gelin
(74) *Attorney, Agent, or Firm* — Coats & Bennett, P.L.L.C.

(57) ABSTRACT

The invention relates to a method in a node for ordering a handover process to handover a user equipment, being in active mode, from a first cell of a first frequency to second cell of a second frequency, being different than the first frequency, comprising the steps of: receiving (82, 92) data relating to a third cell of a third frequency, being the same as the first frequency, from the user equipment, determining (84, 94), based on the received data, that the third cell is a cell to which a soft handover cannot be performed, and, that being the case, ordering a handover process (86, 97) to handover the user equipment to the second cell in order to prevent interference with the third cell.

22 Claims, 7 Drawing Sheets

METHOD AND NODE IN A COMMUNICATIONS NETWORK

TECHNICAL FIELD

The invention relates to a method and a node in a communications network, in particular, it relates to a method in a node for ordering a handover process to handover a user equipment, being in active mode, from a first cell of a first frequency to second cell of a second frequency.

BACKGROUND

Work is ongoing in 3GPP, $3^{rd}$ Generation Partnership Project, and with some operators to specify and investigate the possibility to provide home and/or small area coverage for a limited number of users using a small base station, an Access Point Base Station, commonly called a Femto NodeB for WCDMA, Wideband Code Division Multiple Access, or Femto eNB (E-UTRAN (Evolved-UMTS Terrestrial Radio Access Network) NodeB) for LTE, Long Term Evolution. Other common names are HNB (Home NodeB) for WCDMA or HeNB (Home eNodeB) for LTE.

This Femto node would provide normal LTE/WCDMA coverage for the end users, a so called femto cell, and would be connected to the network using some kind of IP based transmission. One example is to use fixed broadband access (e.g. xDSL or Cable) to connect the Femto node to the network.

There are several ways to use the available frequencies between the femto layer and the traditional cellular deployment layer (in this document referred to as 'macro' layer even though it may comprise both macro, micro and pico cells). There are three Channel Deployment Scenarios (CDS) that are relevant, namely:

CDS1: One frequency used both by the Femto NodeBs and the Macro NodeBs. This CDS has some severe interference problems that will make it hard to work.

CDS2: One dedicated frequency used only by the Femto NodeBs and (at least) another frequency used only by the Macro NodeBs. This CDS could be the preferred one if only technical arguments are taken into account. However, it is very unlikely that operators are willing to dedicate whole frequencies for the femto layer, mostly due to economical reasons.

CDS3: One frequency used both by the Femto NodeBs and the Macro NodeBs and (at least) another frequency used only by the Macro NodeBs.

CDS3 is expected to be a common way for deployments. However, if frequencies are used according to CDS3, interference will occur in certain scenarios.

A small number of Primary Scrambling Codes (PSC) may be allocated to the femto layer, e.g. ten codes. These PSCs are configured in a cell neighbor lists on the macro layer, and signaled to macro layer user equipments UEs for their idle mode cell selection and as potential HO candidates that should be monitored and measured. One of these PSC's is automatically assigned to each Femto NodeB at start up.

In a normal, macro-only scenario (that is, a network without femto cells), the serving RNC controlling the Macro UE would try to perform soft handover, that is, to add a leg to the new base station controlling the detected cell. However, soft handover between macrocells and femtocells is difficult to support and therefore unlikely to be available. The difficulties are related to the expected large number of femto cells and the limitation of space in neighbor lists which will make it hard to address a target femto cell. Furthermore a femto cell is expected to have restrictions with regards to allowed users, that is, have access control.

Therefore, when a Macro UE wants to perform a soft handover from a macro to a femto cell substantial interference may occur. Depending on the location of the Macro UE, this may lead to very poor performance of the interfered femto Node B.

SUMMARY

It is an object of embodiments to provide a method to reduce interference from a wireless communication device between cells of the same frequency.

A method in a node is provided for ordering a handover process to handover a user equipment, being in active mode, from a first cell of a first frequency to second cell of a second frequency, being different than the first frequency. The method comprises the steps of: receiving data relating to a third cell of a third frequency, being the same as the first frequency, from the user equipment, determining, based on the received data, that the third cell is a cell to which a soft handover cannot be performed, and, that being the case, ordering a handover process to handover the user equipment to the second cell in order to prevent interference with the third cell.

In order to perform the method a node is provided arranged for communicating in a communications network comprising a receiving unit for receiving data relating to a third cell from a user equipment. The node further comprises a control unit arranged to determine, based on the received data, that the third cell is a cell to which no soft handover of the user equipment can be performed. That being the case, the control unit is further arranged to create an order to perform a handover of the user equipment from a first present cell of a first frequency to a second cell of a second frequency being different than the first frequency in order to prevent interference with the third cell. The node further comprises a transmitting unit arranged to transmit the order to perform the handover.

Embodiments are disclosed to provide means to minimize the interference by modifying the handover procedures to ensure that a UE will be handed over to another frequency as soon as an interfering cell appears.

Embodiments disclose examples wherein signal strength measurement of the third cell is used to determine that the UE is too close the third cell and that a handover is required.

Hence, the UE is not handed over to improve the own link's quality, but to avoid generating interference to the detected third cell.

BRIEF DESCRIPTION OF THE DRAWINGS

Embodiments will now be described in more detail in relation to the enclosed drawings, in which.

DETAILED DESCRIPTION OF EMBODIMENTS

Figure 1:
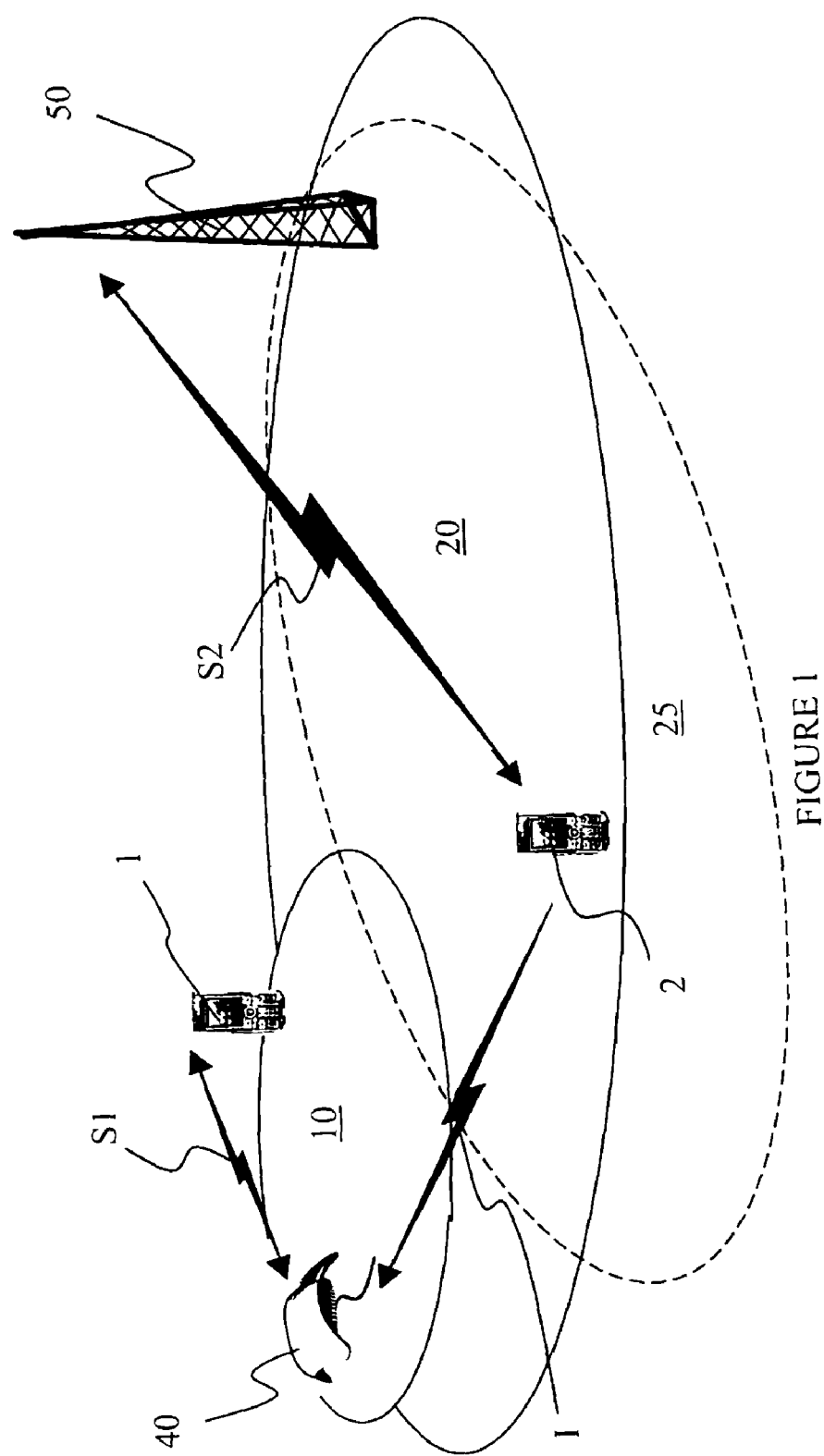
FIG. 1 shows a schematic overview of a communications network.

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof.

As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Well-known functions or constructions may not be described in detail for brevity and/or clarity.

Accordingly, the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Embodiments according to the present invention are described with reference to block diagrams and/or operational illustrations of methods and communication terminals. In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language and/or a lower level assembler language. It will be further appreciated that the functionality of any or all of the program modules may also be implemented using discrete hardware components, one or more application specific integrated circuits (ASICs), or a programmed digital signal processor or microcontroller.

As used herein, a "user equipment" includes, but is not limited to, a terminal that is configured to receive/transmit communication signals via a wireless interface with, for example, a cellular network, a satellite network, a wireless local area network (WLAN), and/or another communication terminal.

The user equipment may be referred to herein as a "wireless communication terminal" or a "wireless terminal." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

As used herein, "mobile terminals" may be portable, transportable, installed in a vehicle (aeronautical, maritime, or land-based), or situated and/or configured to operate locally and/or in a distributed fashion at any other location(s) on earth and/or in space.

In FIG. 1, a schematic overview of a communications network is shown. The network comprises a first base station 50 comprising a first cell 20 of a first frequency and a second cell 25 of a second frequency. Furthermore, the network comprises a second base station 40 comprising a third cell 10 of a third frequency being the same as the first frequency.

A first user equipment 1 is active in a session S1 within the third cell 10 with access control. The third frequency is allocated to the third cell 10. A second user equipment 2 is active in a session S2 within the first cell 20 of the first frequency allocated to the first base station 50. As the second user equipment 2 moves closer to the third cell 10, radio signals from the third cell 10 get stronger and the second user equipment 2 wants a handover operation from the first cell 20 to the third cell 10 to be performed. However, the third cell 10 is a cell to which soft handover cannot be performed, e.g. a femto cell with access control and the second user equipment 2 is forbidden to access the third cell 10.

It should here be noted that since a handover cannot be performed the active session S1 of the first user equipment 1 will be exposed to interference I from the second user equipment 2. In order to avoid this, the second wireless user equipment 2 will, as it is determined that the second user equipment 2 is in proximity of/present to the third cell of the present frequency but to which a soft handover cannot be performed since, for example, the second user equipment 2 is not allowed to access the third cell, be handed over to the second cell 25. This means, for example, that a first handover HO algorithm in the RNC is changed to a different handover algorithm, such as an Inter-Radio Access Technology HandOver IRATHO, Inter-Frequency HandOver, IFHO, or the like.

The scenario applies mostly for WCDMA Femto, but may also apply for LTE Femto. For GSM Femto solutions the interference problem may be avoided by good carrier allocation policy, however if dedicated frequencies cannot be allocated for the femto layer, the scenario may apply also in the GSM case.

Figure 2:
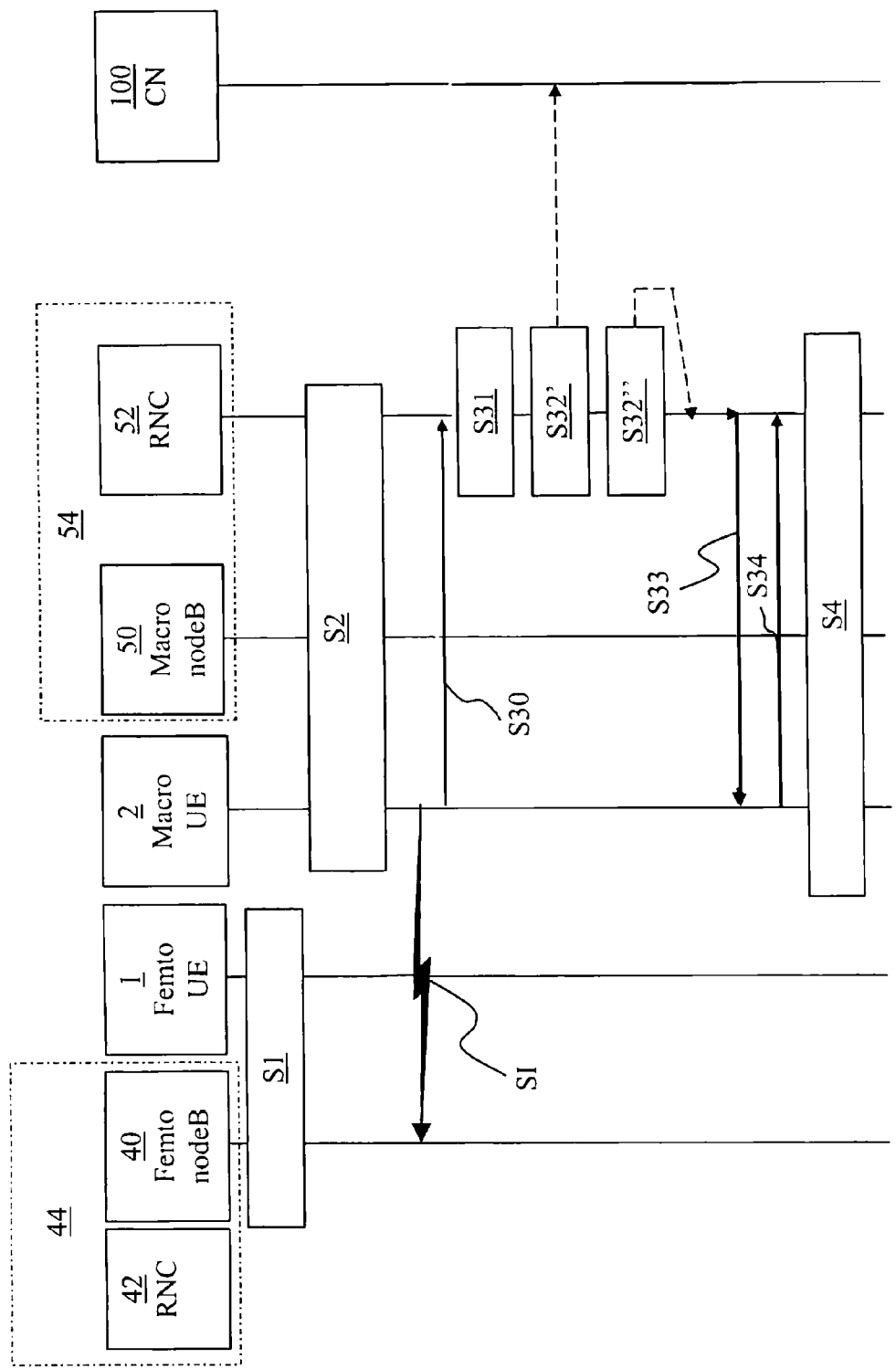
FIG. 2 shows a schematic signaling scheme in a communications network.

In FIG. 2, a schematic signaling diagram in a communications network comprising a normal cell station, called a Macro cell, and an interfering small cell, called femto cell, is shown. In the illustrated example, a third frequency and a first PSC, for example, PSC '200' dedicated to the femto layer, are allocated to the femto cell. It should be understood that also other PSCs may be allocated to the femto layer and reused between the different femto cells. However, all the femto cells may use the same third frequency.

The macro network is configured to include the PSC dedicated to the femto layer, in the illustrated example, PSC '200', in an active/connected mode neighbor cell list in the macro cell providing macro coverage in the Femto cell's location. Hence, the macro cell comprises a Monitored Set of PSCs.

The macro layer uses two frequencies, a first frequency for a first cell and a second frequency for a second cell, and the macro cell in the femto cell's location is configured to use a second PSC, for example, PSC '400'.

In step S1, a first user equipment, UE, 1 in the femto cell is engaged in a session to a femto nodeB 40 connected to a femto RNC 42 on the third frequency and with the first PSC. It should here be noted that the femto nodeB 40 and RNC 42 may be a combined femto access point 44 comprising a base station and a controller unit.

In step S2, a second UE 2 of the macro cell is active in a session to a NodeB 50 of the cell network connected to an RNC 52 of the communications network. The UE 2 is active on the first frequency in the macro cell with the second PSC. The femto cell with the first PSC is configured as part of the Monitored Set for the Macro UE. It should also be noted that the NodeB 50 and the controller unit 52 may be included in a combined controller unit 54.

The second UE 2 gets in the vicinity of the femto cell, as indicated in signal SI, and detects the femto cell.

In step S30, as the second UE 2 starts hearing the first PSC, the second UE 2 includes it in a standard measurement report and sends the standard measurement report to the RNC 52, that is, the serving RNC.

In step S31, the RNC 52 receives the standard measurement report from the second UE 2 and, based on the received report, determines that the second UE 2 has detected/is close to a cell using the first PSC. As the first PSC is only used by femto cells, the RNC 52 knows that the reported cell is a femto cell and that it is not possible to perform soft handover to the femto cell.

Instead IFHO needs to be considered, or a handover to another Radio Access Technology by means of an IRATHO.

In some embodiments, the second UE 2 is ordered by the RNC 52 to perform IFHO, optionally IRATHO, measurements. During these measurements the second UE 2 may need to be ordered to enter compressed mode so that the UE gets time to read information on other frequencies or radio technologies in order to determine whether suitable candidate cells are on other frequencies, optionally RATs. If the candidate cell is found to be "sufficiently good", the RNC 52 triggers an IFHO or IRATHO. This way the probability that the macro UE may continue the session on the new frequency, optionally new RAT of a new frequency, with sufficiently good quality is fairly high.

It should be understood that the RNC 52 may also trigger an IFHO to another frequency without prior UE measurement reports, a so called blind IFHO. This may occur, if the network estimates that the other frequency would be "sufficiently good". This estimation may be based on what the network already knows, such as a load situation on the new frequency and/or the like.

In step 32', the change to another frequency may follow an intra-NodeB/RBS IFHO algorithm. However, optionally the IFHO or IRATHO to another node may take place using standard procedures via the core network, CN, 100 using Iu interface for WCDMA or S1 interface in case of LTE. However, this may cause a prolonged handover procedure.

In step 32", the change to another frequency may follow an intra-NodeB/RBS IFHO algorithm. However, optionally, the IFHO may take place between NodeBs using Iur interface for WCDMA or X2 interface in case of LTE using standard procedures. However, this may cause a prolonged handover procedure.

In step 33, the frequency used may be changed in a number of ways. IFHO or 'Hard Handover' as defined in 3GPP 25.331 in UTRAN is normally performed by using the procedure "Physical channel reconfiguration", but may also be performed by using, for example, one of the following procedures: "radio bearer establishment"; radio bearer reconfiguration; radio bearer release, and transport channel reconfiguration. In the illustrated example a Physical channel reconfiguration message is used.

In step S34, the second UE 2 acknowledges the change by, for example, sending a Physical channel reconfiguration complete message or the like.

In step S4, the session has been moved to another frequency and the femto cell is free from interference from the Macro UE in active mode as well as the Macro UE is free from interference from the femto UE.

Hence, the interference in a femto scenario is reduced.

As mentioned this is valid for other radio technologies as well and may be implemented into systems using only one frequency that is shared by macro and femto layer, I.e. CDS1 as well as a CDS3 scenario.

Figure 3:
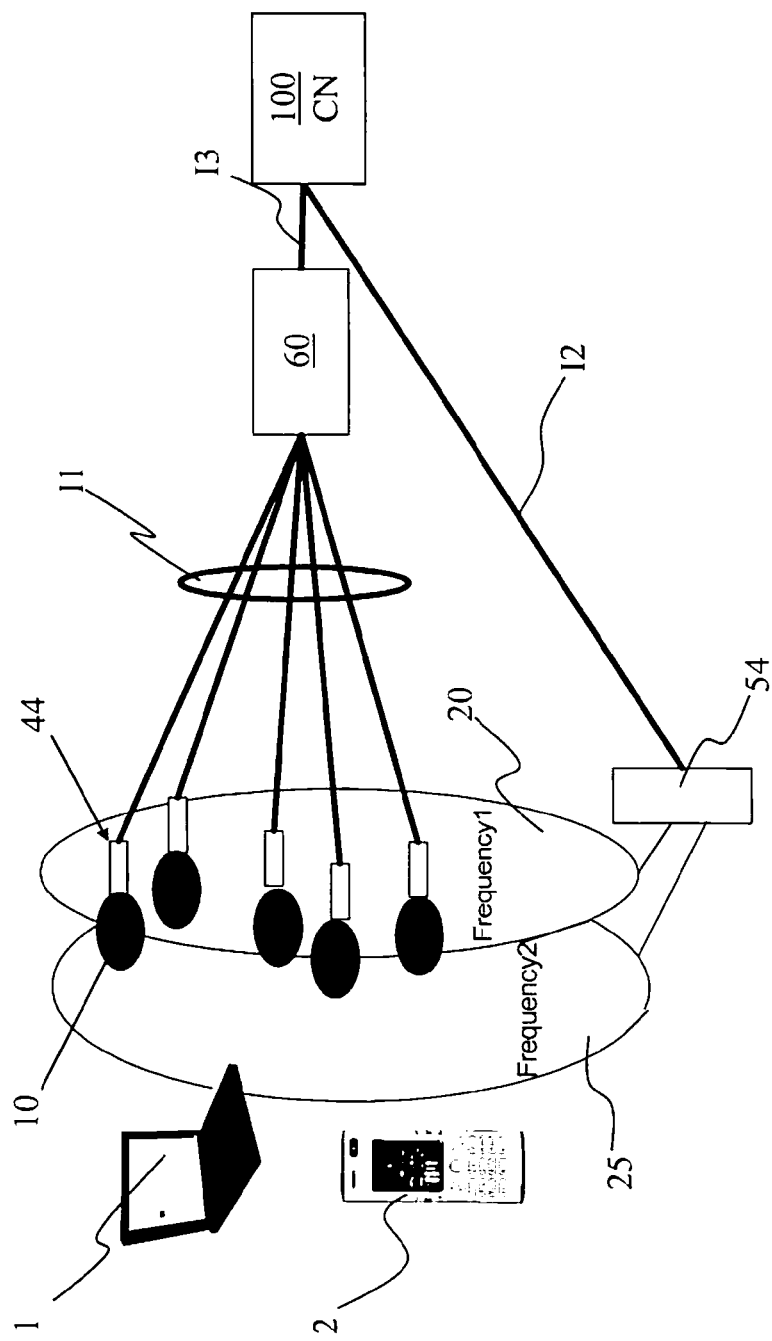
FIG. 3 shows a schematic overview of a LTE network or a WCDMA network of flat architecture.

FIG. 3 shows a schematic overview of a LTE network or a WCDMA network of flat architecture. The network comprises a number of femto cells 10 of femto nodeBs 44, that is, combined RBS/RNC, and a macro nodeB 54, that is, a combined RBS/RNC, with two cells 20 and 25 allocated to the macro base station 50 of different frequencies, a first frequency, frequency 1, and a second frequency, frequency 2. The femto nodeBs 44 are connected to a concentrator node 60 over an IP based backhaul I1, using protocols such as Iu for WCDMA, S1 for LTE or possibly protocols similar to Up, The concentrator node is connected to core network over interface I3, utilizing protocols such as S1 or Iu. The macro nodeB 54 is connected to the core network over backhaul I2, using protocols such as Iu for WCDMA or S1 for LTE, the backhaul may utilize IP/ATM based transmissions. In operation, the macro NodeB 54 receives signal measurements from a second UE 2, indicating that the second UE 2 has detected the femto cell 10. The macro NodeB 54 determines that the second UE 2 needs to be handed over from the first frequency cell 20 to the second frequency cell 25 in order to avoid interference with a first UE 1 connected to the femto cell 10 and orders a handover to be performed. The determination is based on that the target cell is identified as a femto cell 10, for example, from the specific PSCs allocated for the femto layer.

The macro NodeB 54 may comprise a list of cells that UEs are allowed to access and if the femto cell is not indicated in the list, it is determined that the second UE 2 is not allowed to access the femto cell.

Alternatively, the macro NodeB 54 may comprise a list of cells that UEs are not allowed to access and if the femto cell 10 is indicated in the list, it is determined that the second UE 2 is not allowed to access the femto cell. The not allowed cells may for example be identified by the certain PSC's allocated to the femto cells.

Figure 4:
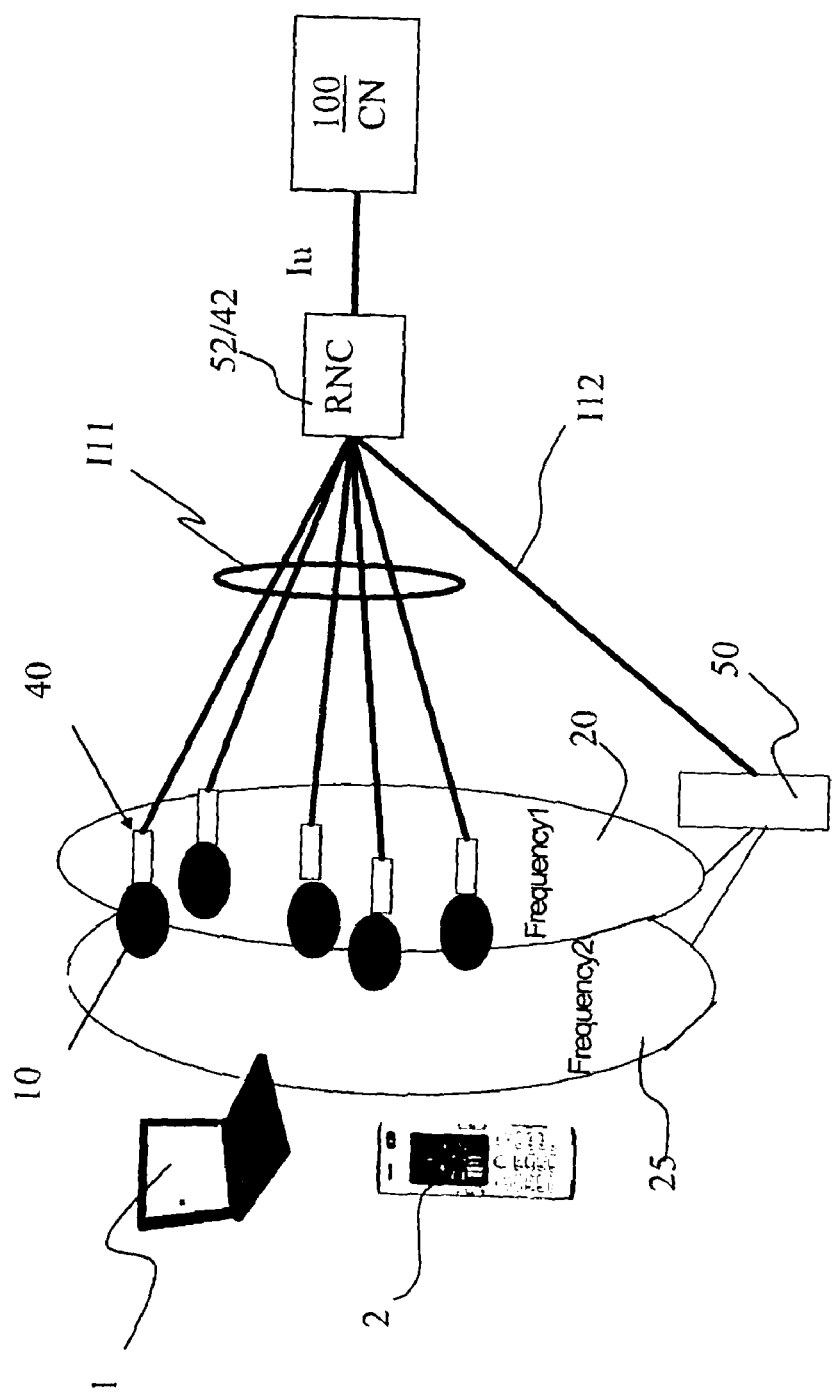
FIG. 4 shows a schematic overview of a traditional WCDMA network architecture.

FIG. 4 shows a schematic overview of a traditional WCDMA network architecture. The network comprises a number of femto nodeBs 40 of a first frequency, frequency 1, each comprising a femto cell 10, and a macro nodeB 50 with two cells 20 and 25 of different frequencies, a first frequency, frequency 1, and a second frequency, frequency 2, allocated to the macro nodeB 50. The femto nodeBs 40 are connected to a RNC 52/42 over backhaul Iub interface I11 for IP based transmissions and the macro nodeB 50 may be connected to the same RNC 52/42 over backhaul Iub interface I12 for IP/ATM based transmissions. The RNC 52/42 may in its turn be connected to a core network 100 over Iu interface.

In operation, the RNC 52/42 receives measurement reports from a second UE 2 over nodeB 50, indicating that the second UE 2 has detected the femto cell 10. The RNC 52/42 determines that the UE 2 needs to be handed over from the first cell 20 to the second cell 25 in order to avoid interference with a first UE 1 connected to the femto cell 10 and orders a handover to be performed. The determination is based on that the target cell is identified as a femto cell 10, for example, from the specific PSCs allocated for the femto layer.

The RNC 52/42 may comprise a list of cells that UEs are allowed to access and if the femto cell is not indicated in the list, it is determined that the second UE 2 is not allowed to access the femto cell.

Alternatively, the RNC 52/42 may comprise a list of cells that UEs are not allowed to access and if the femto cell 10 is indicated in the list, it is determined that the second UE 2 is not allowed to access the femto cell. The cells not allowed to access may for example be identified by the certain PSC's allocated to the femto cells.

Figure 5:
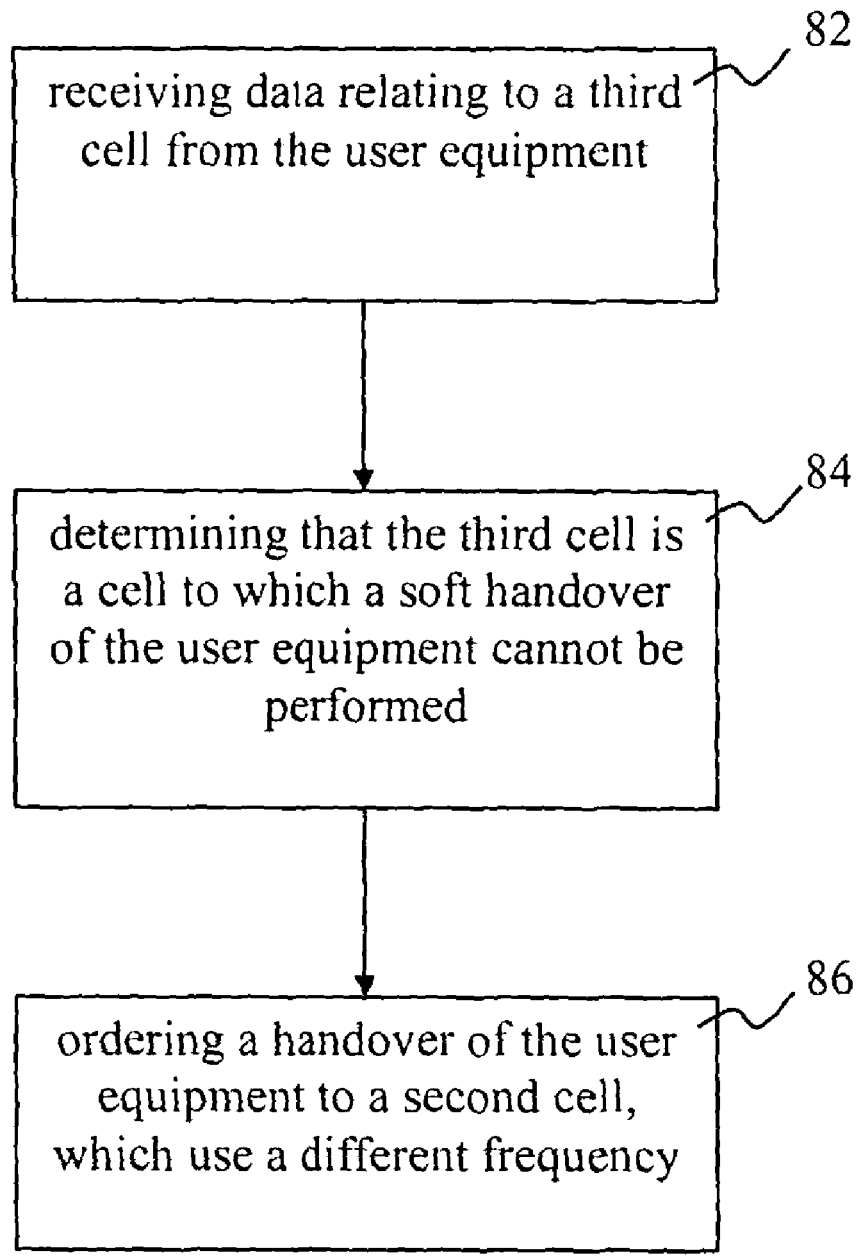
FIG. 5 shows a schematic flow chart of a method for handing over a wireless communication device.

In FIG. 5, a schematic flow chart of a method for handing over a user equipment from a first cell of a first frequency to a second cell of a second frequency is shown.

In step 82, an electronic communication unit in a network, such as an RBS, an RNC, a combined RBS and RNC or the like, receives data relating to a third cell from the user equipment being in an active mode in the first cell.

The received data may comprise data that indicates the identity or type of the third cell detected by the user equipment, signal strength measurements of the third cell and the like. In an example, the data comprises a PSC allocated to the femto layer indicating that the third cell is a restricted femto cell.

In step 84, it is determined that the third cell is a cell, to which a soft handover can not be performed, such as a cell the user equipment is forbidden to access. This may be determined by comparing the PSC from the data with a list of PSCs indicating which PSC that belongs to cells with access control, such as femto cells or the like.

In some embodiments the electronic communication unit comprises a list of cells that user equipment are allowed to access and if the third cell is not indicated in the list, it is determined that the user equipment is not allowed to access the third cell.

Alternatively, the electronic communication unit may comprise a list of cells that user equipment are not allowed to access and if the third cell is indicated in the list, it is determined that the user equipment is not allowed to access the third cell. The not allowed cells may for example be identified by the certain PSC's allocated to the femto cells.

In step 86, upon determination that the user equipment has detected a cell to which a soft handover of the wireless user equipment not can be performed, such as a cell that the user equipment is forbidden to access, ordering a handover process to be performed handing over the user equipment to the second cell which use another frequency or RAT than the cell which was forbidden to access, that is in the example, the femto cell.

In some embodiments the determination may comprise an additional step, comprising to determine that the user equipment is too close the third cell. This may be determined by analyzing the received data and the received data needs to fulfill at least one criterion, such as the received data comprises signal measurements of the third cell from the user equipment and the signal measurements need to exceed a predetermined threshold of signal strength/quality.

Figure 6:
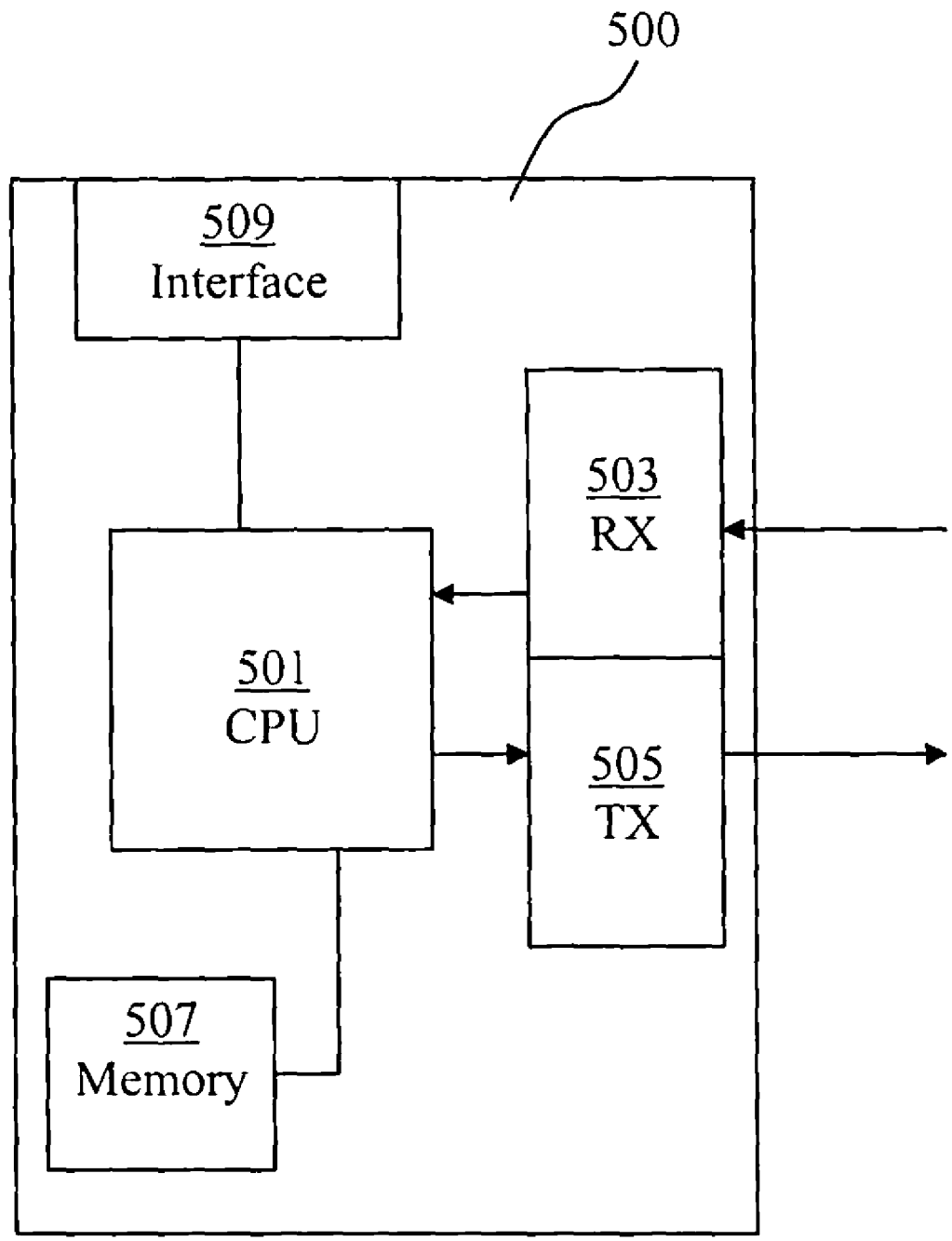
FIG. 6 shows a schematic overview of an electronic communication device, such as a base station, an RNC, or a combined base station and RNC.

In FIG. 6, a schematic overview of a node 500, such as an RNC or the like, is shown. The node 500 comprises a receiving unit 503, RX, arranged to receive data, directly or indirectly, from a wireless user equipment in a first cell of a first frequency. The received data comprises, for example, an indication of an identity of a third cell, an indication of a cell type of a third cell, signal measurement reports of a third cell and/or the like, that the wireless user equipment has detected.

The node 500 further comprises a control unit 501, CPU, arranged, when an application from a memory is executed on the control unit, to determine based on the received data from the receiving unit 503 RX that a soft handover of the wireless user equipment to the third cell is not possible and the wireless user equipment may interfere with/from the third cell, and that being the case, to create an order ordering a handover for the wireless user equipment to a cell of a different frequency. The node 500 may further comprises a transmitting unit 505, TX, arranged to transmit the order to the wireless user equipment or the node 500 may comprise a transmitting interface 509 arranged to transmit the order to a core network device.

In some embodiments, the node 500 may include a list stored in the memory 507 listing indications of cells wherein certain cells may be indicated as cells with unique access control, meaning that public user equipment are not allowed to access the cell. The control unit 501 may be arranged to compare the received indication of the third cell with the corresponding indications in the list in order to determine that a present first handover algorithm should be changed to a second handover algorithm. The second handover algorithm is arranged to switch the user equipment in the first cell to a cell of a second frequency being different than the first frequency in order to prevent interference to the third cell.

Furthermore, the received data from the user equipment may in addition comprise a measurement report of the signal strength/quality or the like of the third cell. The control unit 501 may be arranged to compare the measurement report of the signal strength/quality or the like, to a predetermined threshold value to determine that the wireless user equipment is too close to the third cell and there is a risk of interference.

The control unit 501 may be arranged to change handover algorithm to an IRATHO or IFHO algorithm to switch the user equipment to a second cell of the different frequency.

The memory 507 may be an internal memory, an external memory, a removable memory or the like.

The indication of cell type or identity may be a Primary Scrambling Code, a cell ID or the like.

The node arranged to perform the determining process may be a base station, such as radio base station, RBS, Base Transceiver Station, BTS, Node B, Evolved Node B or the like, a base station controller, such as a radio network controller, RNC, base transceiver controller, BTC, or the like, or a combination thereof.

The list may be a list of monitored active/connected mode neighbor cell ID list, a Monitored Set of PSCs and/or the like.

Figure 7:
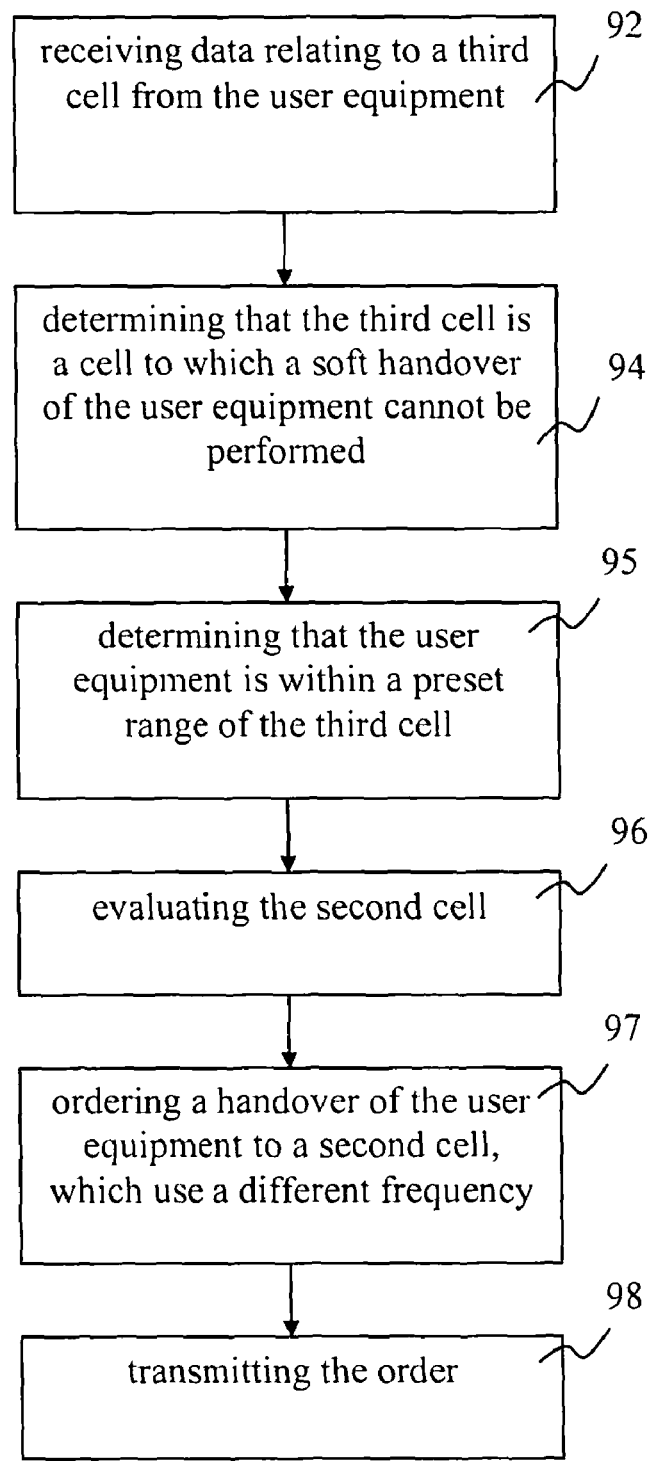
FIG. 7 shows a schematic flow chart of a method for handing over a wireless communication device.

Referring to FIG. 7, embodiments relate to a method in a node for ordering a handover process to handover a user equipment, being in active mode, from a first cell of a first frequency to second cell of a second frequency, being different than the first frequency, comprising the steps of: receiving 92 data relating to a third cell of a third frequency, being the same as the first frequency, from the user equipment, determining 94, based on the received data, that the third cell is a cell to which a soft handover cannot be performed, and, that being the case, ordering a handover process 97 to handover the user equipment to the second cell in order to prevent interference with the third cell.

Additionally, embodiments disclose a method where a soft handover cannot be performed since the third cell is a cell that the user equipment is not allowed to access.

The step of ordering 97 a handover process may further comprise an optional additional step 95 of determining that the user equipment is within a preset range of the third cell.

The received data may comprise, in some embodiments, an indication of a signal strength/quality of a signal from the third cell and the step of determining that the user equipment is within a preset range of the third cell comprises to compare the received signal strength/quality to a predetermined threshold of signal strength/quality and to determine that the received signal strength/quality is higher than the predetermined threshold.

In some embodiments, the received data may comprise data indicating the type or identity of the third cell.

In some embodiments, the received data may comprise a scrambling code and the scrambling code is compared to a preset monitored set of scrambling codes, where certain scrambling codes are set to indicate that the user equipment is forbidden to access a cell using the certain scrambling code.

The step of ordering 97 an handover may comprise the step of creating an order to change handover algorithm to an inter frequency handover algorithm, such as a physical channel reconfiguration, radio bearer establishment, radio bearer reconfiguration, radio bearer release, transport channel reconfiguration and/or the like.

The step of ordering 97 a handover may in some embodiments comprise the step of creating an order to change handover algorithm to an inter radio access technology handover algorithm.

The method may further comprise an optional step of evaluating 96 the second cell by performing measurements on the cell before ordering a handover the wireless communication device.

The step of ordering 97 a handover process may in some embodiments comprise a step of transmitting 98 the order to a core network and/or a user equipment.

Embodiments disclose methods wherein PSCs allocated for the femto layer are also included in the active/connected mode neighbor cell lists for the macro cells, at least in the macro cells using the same frequency as has been allocated for the femto layer.

Referring back to FIG. 6, in order to perform the method a node 500 is provided arranged for communicating in a communications network comprising a receiving unit 503 for receiving data relating to a third cell from a user equipment, a control unit 501 arranged to determine, based on the received data, that the third cell is a cell to which no soft handover of the user equipment can be performed, that being the case, further arranged to create an order to perform a handover of the user equipment from a first present cell of a first frequency to a second cell of a second frequency being different than the first frequency in order to prevent interference with the third cell, and a transmitting unit 505, 509 arranged to transmit the order to perform the handover.

The order may be adapted to be transmitted to the user equipment over a wireless transmitting unit 505 or a core network over a transmitting interface 509.

The control unit 501 may in some embodiments be arranged to determine that the cell is a cell that the user equipment is not allowed and consequently a cell to which no soft handover of the user equipment can be performed.

The received data may comprise data indicating the type or identity of the third cell and the control unit 501 may be arranged to determine that the user equipment is forbidden to access the third cell based on the data and consequently that the third cell is a cell to which no soft handover of the user equipment can be performed.

The received data may comprise a scrambling code and the control unit 501 may be arranged to compare the scrambling code to a preset monitored set of scrambling codes in a list stored in a memory 507 of the node, where at least one scrambling code in the list are set to indicate that the wireless user equipment is forbidden to access a cell using the at least one scrambling code and consequently a cell to which no soft handover of the wireless user equipment can be performed.

Furthermore, the control unit 501 of the node may further be arranged to determine that the user equipment is within a predetermined range of the third cell 10 and that being the case triggering the creation of the handover order.

The received data may comprise a measurement report performed at the user equipment of the third cell and the control unit 501 may be arranged to determine that the user equipment is in the proximity of the third cell by comparing the received signal strength to a predetermined threshold of signal strength and to determine that the user equipment is in the proximity of the third cell when the signal is stronger than the predetermined threshold.

The control unit 501 is arranged to create an order ordering an inter frequency handover and/or an inter radio access technology handover.

The control unit 501 may be arranged to evaluate the second cell by analyzing measurements on the second cell before ordering the handover.

The node 500 may represent a base station, a base station controller unit, or a combined base station/base station controller In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method, operative in a node of a wireless communication network, of ordering a handover process to handover a user equipment in active mode, from a first cell of a first frequency to second cell of a second frequency different than the first frequency, comprising:
   receiving data relating to a third cell of a third frequency the same as the first frequency, from the user equipment;
   determining, based on the received data, that the third cell is a cell to which a soft handover cannot be performed; and
   ordering a handover process to handover the user equipment to the second cell, in response to the received data, in order to prevent interference with the third cell.

2. The method of claim 1, wherein the soft handover cannot be performed since the third cell is a cell that the user equipment is not allowed to access.

3. The method of claim 1, wherein ordering the handover process further comprises determining that the user equipment is within a preset range of the third cell.

4. The method of claim 3, wherein the received data comprises an indication of one of a signal strength and signal quality of a signal from the third cell, and wherein determining that the user equipment is within a preset range of the third cell comprises comparing the received signal strength or quality to a predetermined threshold of signal strength or quality, and determining that the received signal strength or quality is higher than the predetermined threshold.

5. The method of claim 1, wherein the received data comprises data indicating one of the type and the identity of the third cell.

6. The method of claim 1, wherein the received data comprises a scrambling code, and further comprising comparing the scrambling code to a preset monitored set of scrambling codes, wherein certain scrambling codes are set to indicate that the user equipment is forbidden to access a cell using the certain scrambling code.

7. The method of claim 1, wherein ordering a handover comprises creating an order to change handover algorithm to an inter frequency handover algorithm.

8. The method of claim 7, wherein the inter frequency handover algorithm is selected from the group consisting of physical channel reconfiguration, radio bearer establishment, radio bearer reconfiguration, radio bearer release, and transport channel reconfiguration.

9. The method of claim 1, wherein ordering a handover comprises creating an order to change handover algorithm to an inter radio access technology handover algorithm.

10. The method of claim 1, wherein ordering a handover process to be performed further comprises transmitting the order to one of a core network and a user equipment.

11. The method of claim 1, further comprising evaluating the second cell by performing measurements on the cell before handing over the wireless communication device.

12. A node operative to communicate in a communications network, comprising:
   a receiving unit operative to receive data relating to a third cell from a user equipment;
   a control unit operative to determine, based on the received data, that the third cell is a cell to which no soft handover of the user equipment can be performed, and further operative to create an order to perform a handover of the user equipment from a first present cell of a first frequency to a second cell of a second frequency different than the first frequency, in response to the data relating to the third cell, in order to prevent interference with the third cell; and
   a transmitter operative to transmit the order to perform the handover.

13. The node of claim 12, wherein the transmitter is operative to transmit the order to the user equipment.

14. The node of claim 12, wherein the transmitter is operative to transmit the order to a core network.

15. The node of claim 12, wherein the control unit is operative to determine that the user equipment is not allowed to operate in the third cell and that consequently, no soft handover of the user equipment to the third cell can be performed.

16. The node of claim 12, wherein the received data comprises data indicating one of the type and identity of the third cell, and wherein the control unit is operative to determine that the user equipment is forbidden to access the third cell based on the data, and consequently no soft handover of the user equipment to the third cell can be performed.

17. The node of claim 12, wherein the received data comprises a scrambling code and wherein the control unit is operative to compare the scrambling code to a preset monitored set of scrambling codes in a list stored in a memory of the node, where at least one scrambling code in the list is set to indicate that the wireless user equipment is forbidden to access a cell using the at least one scrambling code, and consequently no soft handover of the user equipment to the third cell can be performed.

18. The node of claim 12, wherein the control unit of the node is further operative to determine that the user equipment is within a predetermined range of the third cell, and to trigger the creation of the handover order in response to determination.

19. The node of claim 12, wherein the received data comprises a measurement report performed at the user equipment of the third cell and the control unit is operative to determine that the user equipment is in the proximity of the third cell by comparing a received signal strength to a predetermined threshold of signal strength, and to determine that the user equipment is in the proximity of the third cell when the signal is stronger than the predetermined threshold.

20. The node of claim 12, wherein the control unit is operative to create an order ordering an inter frequency handover.

21. The node of claim 12, wherein the control unit is operative to create an order ordering an inter radio access technology handover.

22. The node of claim 12, wherein the control unit is operative to evaluate the second cell by analyzing measurements on the second cell before ordering the handover.

* * * * *